US006718768B2

(12) United States Patent
Shaffer

(10) Patent No.: US 6,718,768 B2
(45) Date of Patent: Apr. 13, 2004

(54) INERTIA AUGMENTED TURBOCHARGER

(75) Inventor: Bradley J. Shaffer, Romney, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/216,282

(22) Filed: Aug. 12, 2002

(65) Prior Publication Data

US 2004/0025506 A1 Feb. 12, 2004

(51) Int. Cl.[7] .............................................. F02B 33/44

(52) U.S. Cl. ........................................ 60/605.1; 60/607

(58) Field of Search .............................. 60/597, 605.1, 60/607, 608

(56) References Cited

U.S. PATENT DOCUMENTS

| | | | | |
|---|---|---|---|---|
| 4,145,888 A | * | 3/1979 | Roberts ...................... | 60/608 |
| 4,312,183 A | | 1/1982 | Regar | |
| 4,453,381 A | | 6/1984 | Dinger | |
| 5,113,658 A | | 5/1992 | Kobayashi | |
| 5,924,286 A | | 7/1999 | Kapich | |
| 6,374,613 B1 | * | 4/2002 | Filippone ................... | 60/608 |
| 6,553,764 B1 | * | 4/2003 | Gladden et al. ............ | 60/608 |

* cited by examiner

Primary Examiner—Hoang Nguyen
(74) Attorney, Agent, or Firm—Finnegan, Henderson, Farabow, Garrett & Dunner

(57) ABSTRACT

A flywheel assembly for use with a supercharger having a rotatable shaft is provided. The flywheel assembly includes a flywheel configured to rotate about an axis of and be supported by the rotatable shaft and a clutch configured to selectively couple the flywheel to the rotatable shaft.

18 Claims, 3 Drawing Sheets

INERTIA AUGMENTED TURBOCHARGER

TECHNICAL FIELD

This invention relates generally to turbochargers for use with internal combustion engines, and, more particularly, to turbochargers having at least one flywheel assembly.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of an engine.

An internal combustion engine, therefore, may include one or more turbochargers for compressing air to be supplied to one or more combustion chambers within corresponding combustion cylinders. The turbocharger supplies combustion air at a higher pressure and higher density than existing atmospheric pressure and ambient density. The use of a turbocharger can compensate for lack of power due, for example, to altitude, or to otherwise increase power that can be obtained from an engine of a given displacement, thereby reducing the cost, weight, and size of the engine required for a given power output.

A turbocharger typically includes a turbine driven by exhaust gases from the engine, and a compressor driven by the turbine. The compressor receives the air to be compressed and supplies the air to the combustion chamber. A common shaft interconnects the turbine wheel of the turbine with the compressor wheel in the compressor section. A stream of exhaust gases from the engine is conducted from the exhaust manifold to the turbine. The stream of exhaust gasses passing through the turbine causes the turbine wheel to rotate, thereby turning the common shaft interconnecting the turbine wheel and the compressor wheel and rotating the compressor wheel.

Several problems are experienced with previously known constructions for turbochargers as described above. For instance, turbochargers generally take some time to gain speed and provide increased pressure when increased power demands are placed on the system. This generally is the result of rotational inertia of the turbocharger. Therefore, when the engine is operating under conditions that require quick increases in power, a delay period occurs while the turbocharger accelerates and desired instantaneous increases in power cannot be achieved. This also holds true when the engine is operating under conditions that require quick decreases in power and pressure. Addition/removal of large electrical loads or "block loads" incurred while providing a constant rotational speed for the engine are an example of the transient loads that may require quick changes in power.

As the engine runs, the turbocharger will cycle through various ranges of rotational speed as power is added or removed. Because of the rotational inertia of the turbocharger, it is often necessary to run the engine at low efficiency to control heating of the exhaust flow during periods of transient loads, thereby controlling rotational speeds of the turbocharger. These low efficiency operations have the drawback of increasing the emissions of, for example, soot and nitrogen oxides.

One solution for providing a quick response is described in U.S. Pat. No. 4,312,183, entitled "EXHAUST GAS TURBOCHARGER FOR DIESEL ENGINES," issued Jan. 26, 1982 This patent describes a turbocharger having a compressor, an exhaust gas turbine, and a shaft joining the exhaust gas turbine to the compressor. A flywheel is supported on a separate shaft and is coupled/uncoupled to the shaft of the turbocharger through a freewheel on the shaft. The shaft supporting the flywheel includes two portions that are connected through a summation device. However, this arrangement has several drawbacks including the number of additional components and the complicated interconnection between components.

The present invention solves one or more of the problems described above associated with existing turbochargers.

SUMMARY OF THE INVENTION

In one aspect of the present invention, a flywheel assembly for use with a supercharger having a rotatable shaft is provided. The flywheel assembly includes a flywheel configured to rotate about an axis of and be supported by the rotatable shaft and a clutch configured to selectively couple the flywheel to the rotatable shaft.

In another aspect of the invention, a turbocharger system is provided with a turbocharger including a turbine, a compressor, and a shaft connecting the turbine to the compressor. A flywheel assembly is supported by the shaft.

In yet another aspect of the invention, a method of operating a turbocharger system having a turbocharger is provided. The turbocharger may include a turbine, a compressor, and a shaft connecting the turbine to the compressor. The turbocharger system may also have a flywheel assembly supported by the shaft. The method includes supplying gas to the turbine to rotate the shaft, compressing gas via rotation of the compressor, and selectively engaging the flywheel assembly with the shaft to perform one of adding rotational energy to the turbocharger and removing rotational energy from the turbocharger.

BRIEF DESCRIPTION OF THE DRAWINGS

The accompanying drawings, which are incorporated in and constitute a part of this specification, illustrate several exemplary embodiments of the invention and together with the description, serve to explain the principles of the invention. In the drawings.

DETAILED DESCRIPTION

Reference will now be made in detail to the present exemplary embodiments of the invention, which are illustrated in the accompanying drawings. Wherever possible, the same reference numbers will be used throughout the drawings to refer to the same or like parts.

Figure 1:
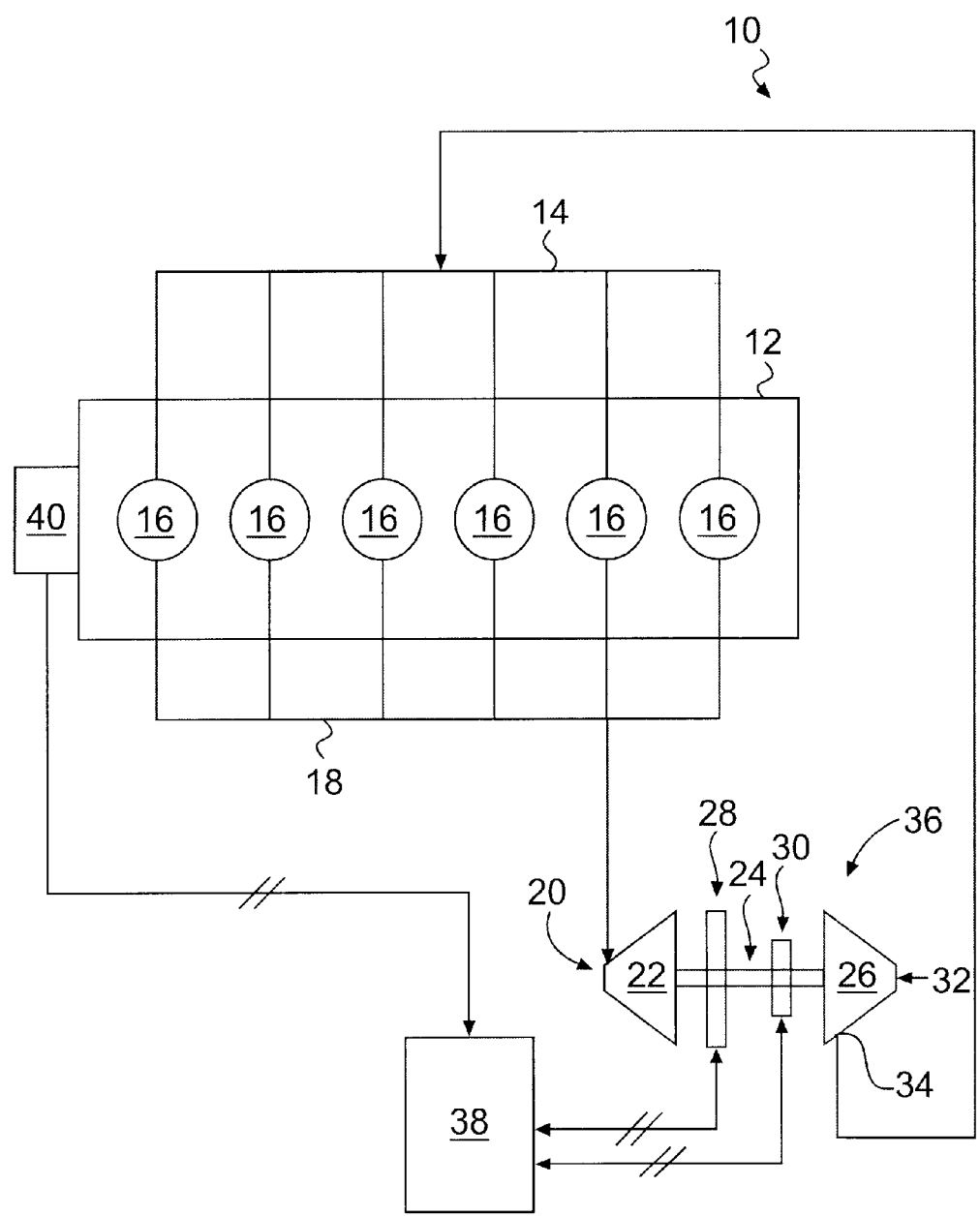
FIG. 1 is a schematic diagram of an exemplary embodiment of a turbocharger of the present invention in conjunction with an internal combustion engine.

FIG. 1 shows an internal combustion engine 10 including an engine block 12 with an intake manifold 14, combustion cylinders 16, an exhaust manifold 18, and a supercharger. In the exemplary embodiments shown, the supercharger is a turbocharger 20. The turbocharger 20 includes a turbine 22, a shaft 24, and a compressor 26. First and second flywheel assemblies 28, 30 may be supported on the shaft 24. The turbocharger 20 may include any conventional turbocharger, for example, a variable geometry turbocharger.

The turbine 22 is in fluid communication with exhaust manifold 18, which is coupled to combustion cylinders 16. The turbine 22 is coupled to shaft 24. The turbine wheel of the turbine 22 may include, but is not limited to, rotational flow, axial flow, or mixed flow turbine wheel designs.

The compressor 26, also coupled to the shaft 24, includes an air inlet 32 and an air outlet 34. Air outlet 34 is in fluid communication with intake manifold 14, which is in fluid communication with combustion cylinders 16. The turbocharger 20, first flywheel assembly 28, and second flywheel assembly 30 form one exemplary embodiment of a turbocharger system 36.

The internal combustion engine 10 may be provided with a controller 38, which is operably coupled with first flywheel assembly 28 and second flywheel assembly 30. The controller 38 may also interconnect with a sensor 40 mounted on the engine block 12 for sensing an operating condition(s) associated with internal combustion engine 10, for example, boost, engine speed, cylinder pressure, smoke opacity, emission rate of carbon dioxide, carbon monoxide, and/or nitrogen oxides, exhaust gas re-circulation rate, exhaust gas temperature, combustion knock, flame speed, driven generator frequency, current output of driven generator, intake manifold absolute pressure, throttle position, throttle command signal, fuel delivery dwell time, propeller position command signal for marine propulsion with a controllable pitch propeller, engine start signal, flywheel speed, turbo speed, power demand, fuel use, altitude, barometric pressure, airflow, inlet manifold temperature, inlet temperature to compression, and block loads. Controller 38 modulates turbocharger input to produce sufficient air while preventing excess boost, surge, and excessive turbo speed.

Figure 2:
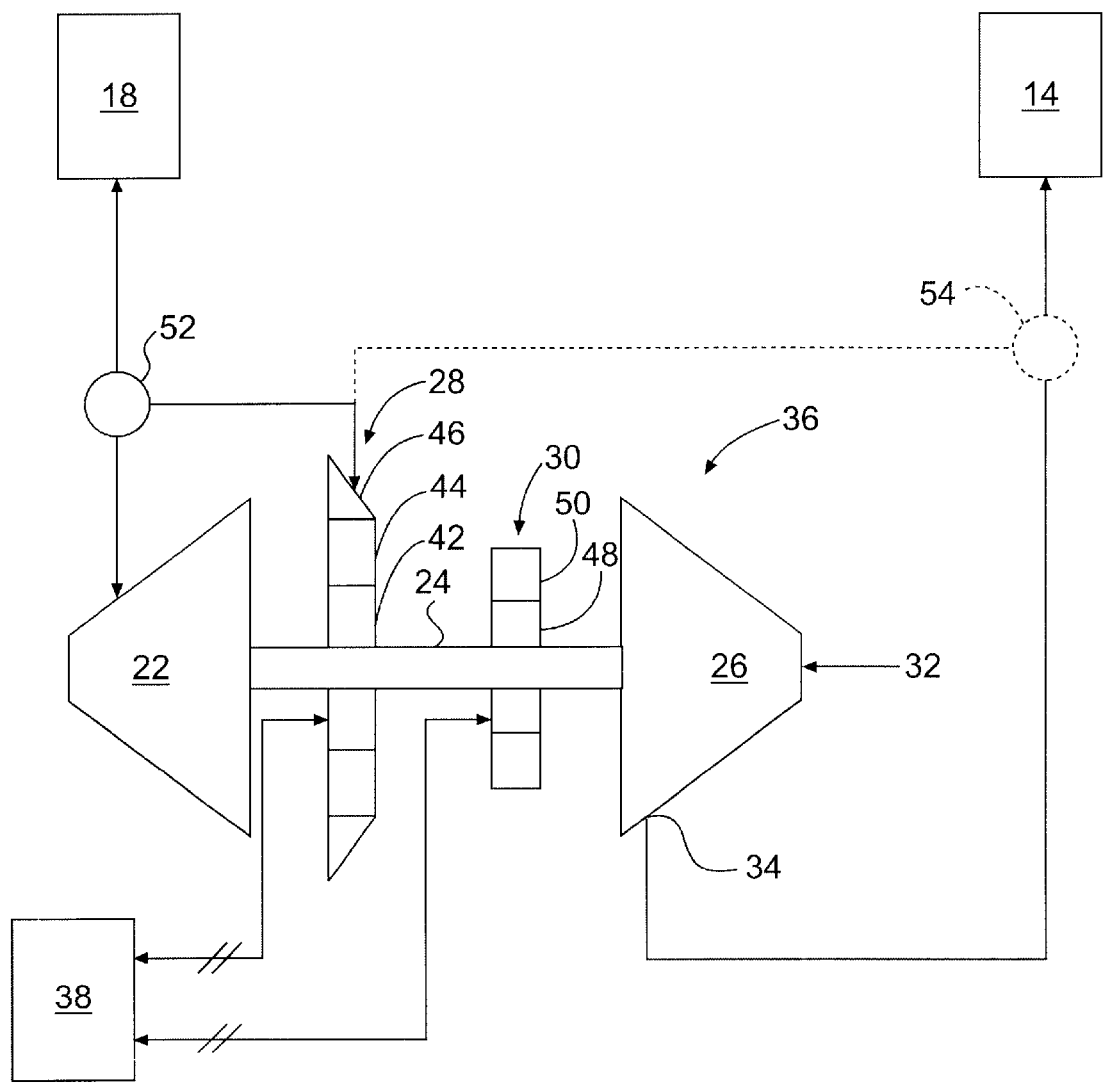
FIG. 2 is a more detailed schematic diagram of one exemplary embodiment of the turbocharger of FIG. 1.

A more detailed view of the exemplary turbocharger system 36 is seen in FIG. 2. The first flywheel assembly 28 includes a clutch 42, a flywheel 44, and a plurality of turbine blades 46. The second flywheel assembly 30 includes a clutch 48 and a flywheel 50. Each flywheel 44, 50 is configured to rotate about an axis of the shaft 24.

A valve 52, as shown in FIG. 2, may be arranged between the exhaust manifold 18 and the turbine 22 to place the exhaust manifold 18 in fluid communication with the first flywheel assembly 28. Additionally, as indicated by the dashed lines, a valve 54 may be provided between the compressor 26 and the intake manifold 14 to place compressed gas, such as, for example, compressed air or a compressed air/fuel mixture in fluid communication with the first flywheel assembly 28. Valves 52, 54 are configured to bleed off either exhaust gas or compressed air to cause rotation of flywheel 44 of the first flywheel assembly 28. The valves 52, 54 may be ball valves, solenoid valves, or any other suitable valve arrangement allowing flow communication from the exhaust manifold 18 or compressor 26 to the first fly wheel assembly 28. The valves 52, 54 may alternatively be a hole of a pre-selected size bored into the flow path of the exhaust gas or compressed air to provide the desired amount of flow to the first flywheel assembly 28.

The clutches 42, 48 are supported by the shaft 24 and are configured to engage/disengage the flywheels 44, 50, respectively, to and from the shaft 24. The clutches are shown as being electronically controllable by controller 38 and are configured to proportionally engage/disengage the flywheels. It is understood that other conventionally controlled clutches, such as, for example, mechanically-controlled or hydraulically-controlled clutches may also work and are within the scope of the invention. The clutches 42, 48 are shown as being permanently fixed to the shaft 24, but each clutch 42, 48 may also be permanently fixed to the flywheels 44, 50, respectively, and configured to proportionally engage/disengage the shaft 24.

The first flywheel assembly 28, also referred to as a high speed flywheel assembly, is configured to store energy to be added to the turbocharger 20 when it is necessary to increase the power in the turbocharger or to quickly increase rotational speed of the turbocharger. The turbine blades 46 are provided on the outer periphery of the flywheel 44 to help overcome friction and rotate the flywheel at a predetermined speed above the speed of shaft 24 when driven by the exhaust gases or compressed air. The turbine blades 46 may be rigidly fixed to the flywheel 44 using conventional means or they may be movable with respect to the flywheel 44, such as, for example, by providing variable pitch turbine blades or variable geometry turbine blades.

The second flywheel assembly 30, also referred to as a static flywheel assembly, is configured to remove excess energy from the turbocharger 20 when it is necessary to decrease power of the turbocharger or to quickly decrease the speed of the turbocharger. Different viscous mediums, such as, for example, oil or air, as well as other frictional drag devices, such as, for example, mechanical brake, counteracting turbine blades, or electromagnetic forces, may be provided to resist rotation of the flywheel 50, thereby withdrawing rotational energy from the turbocharger. Optionally, a brake mechanism 56 (shown associated with the first flywheel assembly 28 in FIG. 2) may be associated with the first flywheel assembly 28 and/or the second flywheel assembly 30. The brake mechanism 56 may be any conventional brake mechanism such as, for example, a disc- or plate-type brake, a cone-type brake, a block brake, or a band brake.

Figure 3:
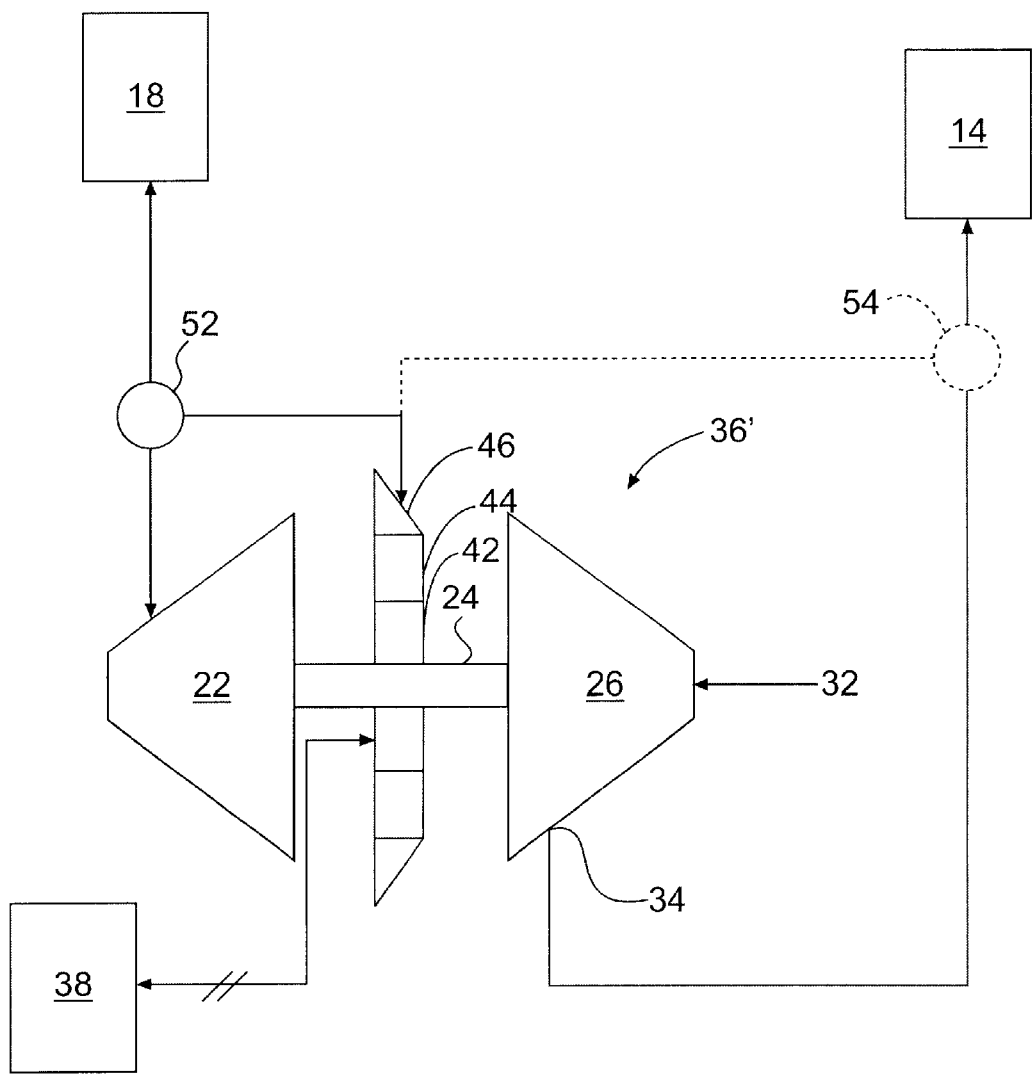
FIG. 3 is schematic diagram of another exemplary embodiment of the turbocharger.

A second embodiment for a turbocharger system 36', as seen in FIG. 3, may eliminate one of the flywheel assemblies 28, 30 depending on the results desired. For example, in this embodiment, the second flywheel assembly 30 has been eliminated, and the turbocharger system is configured to add energy to the turbocharger 20 when necessary. In such an embodiment, the turbocharger system 36' could be modified so that the first flywheel assembly 28 could perform both functions of adding and removing energy from the turbocharger 20 by, for example, altering the directional flow of exhaust gas or compressed air against the turbine blades 46. Alternatively, the first flywheel assembly 28 could be eliminated leaving the second flywheel assembly 30 (not shown), and the turbocharger system would function to remove energy from the turbocharger 20.

Further modifications to the turbocharger system may exist and will be discussed in relation to the operation of the turbocharger system and the desired results. Although the exemplary embodiment has been described in relationship to a turbocharger, the flywheel assemblies may be used with different types of superchargers. For example, the supercharger may be mechanically driven by an output of the engine, and the flywheel assembly may be driven by exhaust gas from the engine or compressed gas from the compressor of the supercharger.

Industrial Applicability

To improve turbocharger response and consequently engine response to transient loads, the disclosed systems utilize the rotational inertia of the turbocharger system to its advantage. By being able to engage/disengage various flywheel assemblies, the turbocharger can more quickly respond to the increased/decreased air mass flow demand of the engine. Moreover, connecting the flywheels to the turbocharger shaft results in a system that is compact in size, utilizes fewer components, and is cost effective to make.

One mode of operating the turbocharger system 36 will be described in relation to FIGS. 1 and 2. During use, exhaust gas generated in combustion cylinders 16 is conducted from exhaust manifold 18 and rotatably drives turbine 22. The turbine 22 transmits the rotational force through the shaft 24 to the compressor 26. The compressor 26 receives air at air inlet 32, compresses the air, and communicates the compressed air to intake manifold 14 for use in the combustion cylinders 16. Generally, the shaft 24 will rotate free of the flywheel assemblies 28, 30.

A portion of the exhaust gas from the exhaust manifold 18 may be communicated through valve 52 to the plurality of turbine blades 46, thereby rotatably driving the flywheel 44 of the first flywheel assembly 28 to the predetermined speed or "freewheeling" above the speed of the shaft 24. For example, if the shaft 24 is rotating at 40,000 rpm, the flywheel 44 may be rotating at 80,000 rpm. Alternatively, a portion of compressed gas, such as, for example, compressed air or a compressed air/fuel mixture from the compressor 26 may be communicated through valve 54 to the plurality of turbine blades 46. At the same time that the flywheel 44 of the first flywheel assembly 28 is rotating at the predetermined speed, the flywheel 48 of the second flywheel assembly 30 may be substantially at rest.

During periods of suddenly applied transient loads, the controller 38 will attempt to rapidly increase the speed of the turbocharger 20 to increase the air mass flow out of the compressor 26. Proportionally engaging the flywheel 44 of the first flywheel assembly 28, depending on the amount of rotational energy to be removed from the flywheel, and coupling it to the shaft 24 can accomplish this increase in air mass flow. As a result, the proportional amount of rotational energy of the flywheel 44 would be added to the rotational energy of the shaft 24, thereby increasing the air mass flow out of the compressor 26. Once the internal combustion engine has returned to a steady-state operation, the clutch 42 is disengaged from the flywheel 44 and the flywheel 44 can then return to the predetermined speed above the speed of the shaft 24.

During periods of suddenly removed block loads, the controller will attempt to rapidly decrease the speed of the turbocharger 20 to decrease the air mass flow out of the compressor 26. Proportionally engaging the flywheel 50 of the second flywheel assembly 30, depending on the amount of rotational energy to be removed from the shaft, and coupling it to the shaft 24 can accomplish this decrease of air mass flow. As a result, the proportional amount of rotational energy of the shaft 24 is absorbed by the flywheel 50, thereby decreasing the air mass flow out of the compressor. Once the internal combustion engine has returned to a steady-state operation, the clutch 48 is disengaged from the flywheel 50. The flywheel 50 may then decrease its speed to a substantially zero rotational speed.

A similar mode of operation may apply to the turbocharger system 36' in FIG. 3., with the exception that this embodiment does not include a second flywheel assembly to remove excess rotational energy from the shaft 24 of the turbocharger 26. It is understood that the first flywheel assembly 28 can additionally be configured to remove excess rotational energy by the proper selection of turbine blades 46, such that providing air flow from either the exhaust manifold or the compressor 26 would act to brake the rotation of the shaft 24.

Furthermore, the turbocharger system 36' could be configured to add and remove energy from the turbocharger 20 by altering the directional flow of exhaust gas or compressed air against the turbine blades 46. For example, exhaust gas directed at the turbine blades 46 from one side of the flywheel assembly 28 may be used to store additional energy in the flywheel 44, while compressed air directed at the turbine blades 46 from the opposite side of the flywheel assembly 28 may be used to remove energy from the turbocharger system 36' by braking rotation of the shaft 24 while engaged with the shaft 24.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flywheel assembly for use with a supercharger having a compressor and a power source driving the compressor, the flywheel assembly comprising:
    a flywheel operatively coupled to the compressor and the power source;
    turbine blades disposed around an outer periphery of the flywheel; and
    a clutch configured to selectively couple and decouple the flywheel to and from the compressor and the power source.

2. The flywheel assembly according to claim 1, wherein the flywheel and the clutch are connected.

3. The flywheel assembly according to claim 1, wherein the flywheel is configured to rotate at a predetermined speed.

4. The flywheel assembly according to claim 1, wherein the turbine blades have variable pitch.

5. A turbocharger system, comprising:
    a turbocharger including a turbine, a compressor, and a drive connection coupling the turbine to the compressor; and
    a first and second flywheel assembly, the first flywheel assembly having a first flywheel and a first clutch configured to selectively couple and decouple the first flywheel to and from the turbine, compressor, and drive connection.

6. The turbocharger system according to claim 5, wherein the flywheel assembly includes a plurality of turbine blades disposed around an outer periphery of the flywheel.

7. The turbocharger system according to claim 5, wherein the second flywheel assembly includes a second flywheel and a second clutch configured to selectively couple and decouple the second flywheel to and from the drive connection.

8. The turbocharger system according to claim 7, wherein the second flywheel of the second flywheel assembly includes turbine blades mounted to the outer periphery of the second flywheel.

9. An internal combustion engine, comprising:
    an engine block defining a plurality of combustion cylinders, an intake manifold, and an exhaust manifold;
    a turbocharger including a turbine, a compressor, and a drive connection coupling the turbine to the compressor, the compressor being fluidly connected with the intake manifold, the turbine being fluidly connected with the exhaust manifold; and
    a flywheel assembly having a flywheel and a clutch configured to selectively couple and decouple the flywheel to and from the drive connection, and a plurality of turbine blades disposed around an outer periphery of the flywheel.

10. The internal combustion engine according to claim 9, further including a second flywheel and a second clutch configured to couple and decouple the second flywheel to and from the drive connection.

11. The internal combustion engine according to claim 10, further including a brake mechanism configured to slow rotation of at least one of the flywheel and the second flywheel.

12. The internal combustion engine according to claim 10, further including a controller and a sensor configured to sense an engine condition, the controller being configured to selectively engage and disengage the clutches based on the sensed engine condition.

13. The internal combustion engine according to claim 9, further including a valve configured to supply gas from one of the exhaust manifold of the internal combustion engine and the compressor of the turbocharger to the plurality of turbine blades of the flywheel.

14. A method of operating a turbocharger system having a turbocharger including a turbine, a compressor, a drive connection coupling the turbine to the compressor, and a flywheel assembly, the method comprising:

supplying gas to the turbine to motivate the drive connection;

compressing gas via rotation of the compressor;

selectively coupling and decoupling the flywheel assembly to and from the turbine, compressor, and drive connection to perform one of adding rotational energy to the turbocharger and removing rotational energy from the turbocharger; and storing rotational energy in the flywheel assembly prior to engagement with the drive connection, by providing a gas flow to a plurality of turbine blades attached to a flywheel of the flywheel assembly.

15. The method according to claim 14, wherein said storing rotational energy includes disengaging a clutch from a flywheel of the flywheel assembly.

16. The method according to claim 14, further including engaging a second flywheel assembly to remove rotational energy from the turbocharger.

17. The method according to claim 14, wherein said selectively engaging the flywheel assembly includes at least partially engaging a clutch with a flywheel of the flywheel assembly to add rotational energy to the turbocharger.

18. The flywheel assembly of claim 1, wherein the power source is a turbine assembly.

* * * * *